United States Patent [19]

Lajos

[11] Patent Number: 4,881,132

[45] Date of Patent: Nov. 14, 1989

[54] APPARATUS AND METHOD FOR COORDINATING THE FRONT AND BACK OF A PRINTER APPARATUS HAVING TWO-SIDED PRINTING CAPABILITY

[75] Inventor: Jaroslav Lajos, Edmond, Okla.

[73] Assignee: Honeywell Bull Inc., Phoenix, Ariz.

[21] Appl. No.: 190,209

[22] Filed: May 4, 1988

[51] Int. Cl.[4] ........................ H04N 1/23; G01D 15/06

[52] U.S. Cl. .................................... 358/296; 358/302; 358/300; 346/150; 346/153.1; 346/160

[58] Field of Search ............... 358/296, 293, 304, 300, 358/302; 355/23, 24, 46; 346/150, 153.1, 160

[56] References Cited

U.S. PATENT DOCUMENTS 4,174,905 11/1979 DiFrancesco ......................... 355/23
4,475,128 10/1984 Koumura ............................ 358/296
4,579,446 4/1986 Fujino .................................. 355/24

*Primary Examiner*—C. L. Albritton
*Assistant Examiner*—Scott A. Rogers
*Attorney, Agent, or Firm*—J. H. Phillips; J. S. Solakian

[57] ABSTRACT

In a two-page printer system, there is included a first and second print engine placed on a path in which paper to be printed travels and displaced a distance, L, from one another along the path, the first print engine printing a first side of the paper and the second print engine printing a second side of the paper. The two-page printer system also includes an apparatus for coordinating the printing of the paper, the two-page printer further including a process controller for generating control signals. The apparatus comprises a first storage element for storing information to be printed. A processor element, operatively connected to the first storage element, formats the information to be printed in a form required by the printer, the information to be printed being fetched from first storage element. A second storage element, operatively connected to the processor element, stores the formatted information, the formatted information being transmitted to the first print engine in response to a first control signal and transmitted to the second print engine in response to a second control signal, thereby coordinating the printing of the first and second side of the paper.

4 Claims, 5 Drawing Sheets

APPARATUS AND METHOD FOR COORDINATING THE FRONT AND BACK OF A PRINTER APPARATUS HAVING TWO-SIDED PRINTING CAPABILITY

BACKGROUND OF THE INVENTION

This invention relates to a printer system, and more particularly, to an apparatus and method for coordinating the printing of the front side and back side of a page for a page printer system having the capability of printing both sides of the page on a single pass of the paper.

In the prior art there are many types of printers that are used with data processing equipment. Examples of such prior art printers are impact printers which include daisy wheel and dot matrix printers, and laser printers which use a copier process coupled with a laser that writes the material to be printed to an image drum within the printer. There are also many other types of prior art printers. All these prior art data processing printers only do one sided printing, and to accomplish two sided printing, paper already printed on one side must be placed back into the printer to have the reverse side printed. This is an awkward, time consuming process, and mistakes are often made in the process. Attempts to create two-sided printers have resulted in printers having complex paper handling apparatus that print first on one side of the paper and afterwards print on the other side of the paper. Such two-sided printers are expensive and require frequent maintenance, usually by a skilled technician, due to their complicated construction.

Accordingly, there is a need for a printer that can perform two-sided printing, sometimes referred to herein as "two-page" printing, without having to reload paper already printed on one side back into the printer, and that can perform two-sided printing at a much faster rate than heretofore possible. The apparatus and method of the present invention provides for the coordination of printing the front side and back side of the page.

SUMMARY OF THE INVENTION

Therefore, there is provided in the present invention an apparatus and method for coordinating the printing of both sides of the page as the page progresses along a predetermined path through the two-sided printer apparatus.

In a two-page printer system, there is included a first and second print engine placed on a path in which paper to be printed travels and displaced a distance, L, from one another along the path, the first print engine printing a first side of the paper and the second print engine printing a second side of the paper. The two-page printer system also includes an apparatus for coordinating the printing of the paper, the two-page printer further including a process controller for generating control signals. The apparatus comprises a first storage element for storing information to be printed. A processor element, operatively connected to the first storage element, formats the information to be printed in a form required by the printer, the information to be printed being fetched from the first storage element. A second storage element, operatively connected to the processor element, stores the formatted information, the formatted information being transmitted to the first print engine in response to a first control signal and transmitted to the second print engine in response to a second control signal, thereby coordinating the printing of the first and second side of the paper. Accordingly, it is an object of the present invention to provide an apparatus and method for coordinating the printing of the front and back side of a page.

It is another object of the present invention to provide an apparatus and method for coordinating the printing of the front and back side of a page as the page progresses through a printing apparatus.

It is still another object of the present invention to provide an apparatus and method for coordinating the printing of the front and back side of a page as the page progresses through a printing apparatus in a single pass.

These and other objects of the present invention will become more apparent when taken in conjunction with the following description and attached drawings, wherein like characters indicate like parts, and which drawings form a part of the present application.

DETAILED DESCRIPTION

Figure 1:
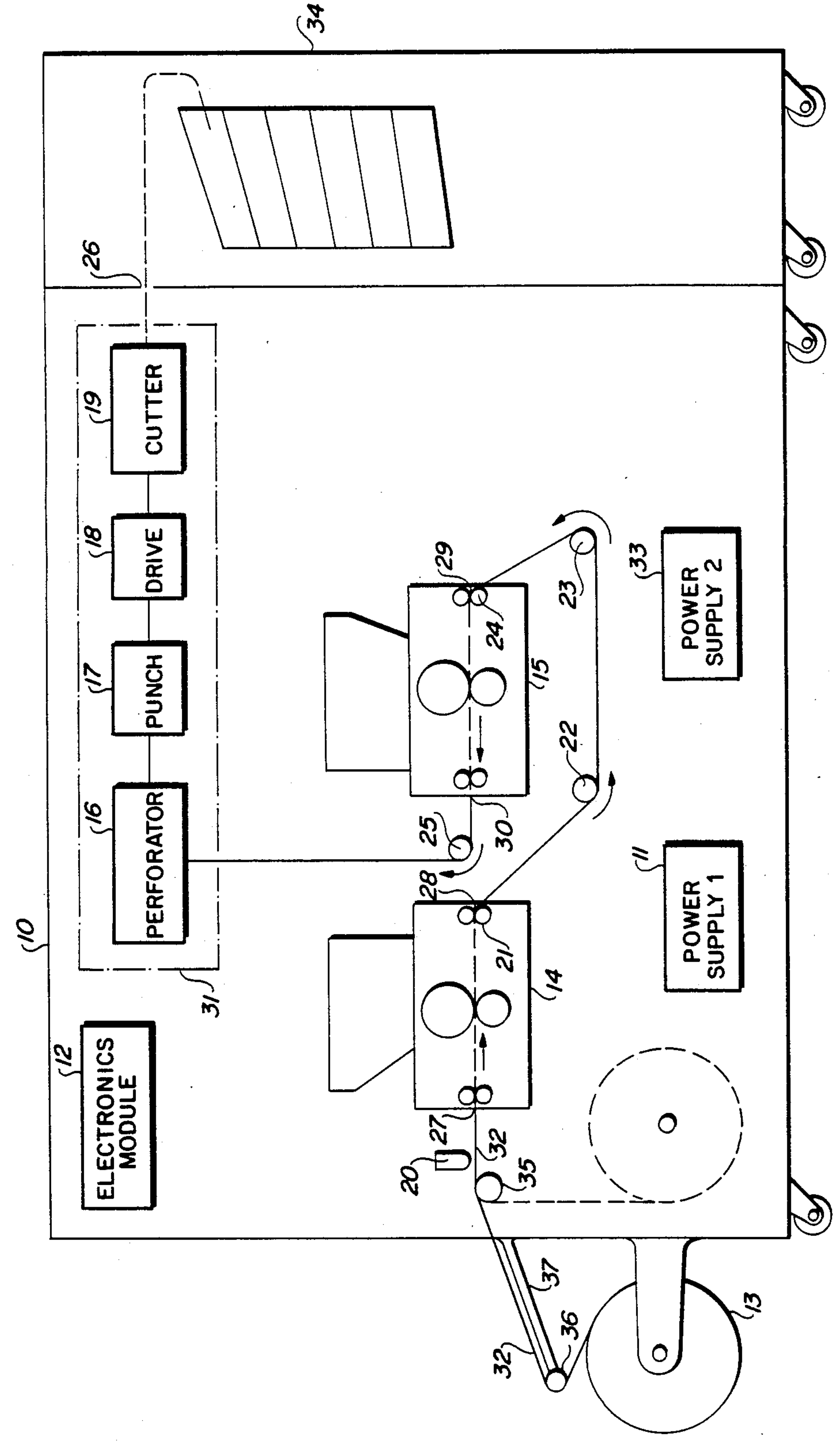
FIG. 1 shows a front view of the inside of a housin containing the modular printer having a simple paper handling mechanism and that can be equipped with one or two printing mechanisms to perform one-sided or two-sided printing.

Referring to FIG. 1, there is shown a front view of a printer housing 10 in which there is located a number of modules that make up the printer system which incorporates the present invention. Located in the bottom of housing 10 are power supplies 11 and 33 that are both connected to AC power and provide the power to all the other modules inside of housing 10. Supplies 11 and 33 each may conveniently be made up of a number of smaller modular power supplies (not shown) that may be easily accessed for maintenance or replacement. These power supplies are heavy and by mounting them in the bottom of housing 10 the center of gravity of the printer is lowered for safety considerations. When only one printing station (also referred to herein as print engine) 14 or 15 is provided only one of the power supplies are provided, and when both these printing stations are provided both power supplies are provided.

There is also an electronics module 12 mounted at the top left of housing 11 where it is easily accessible from the top for testing, maintenance and replacement. Module 12 advantageously uses plug in printed circuit cards. The printed circuit cards are easily and quickly replaced to speed up maintenance and repairs, and also permit fast upgrading of the electronics. Electronics module 12 has the logic that basically controls all the other modules inside of housing 10, and receives, stores, and initially processes the electronic signals that indicate the alphanumeric and other images to be printed, and will be discussed further hereinunder.

The printer described herein preferably uses a roll of paper 13 that is to be printed on, rather than using discrete sheets of paper from a sheet feeder. The use of a roll of paper 13 simplifies the handling of paper 32 between the modules inside of printer housing 10. In FIG. 1 paper roll 13 is shown mounted external to printer housing 10 for ease of replacing the paper roll. External mounting is the preferred embodiment of the invention and permits large diameter rolls to be used, but paper roll 13 may alternatively be mounted internal to printer housing 10 as shown in the dotted lines. With the alternate internal mounting, only smaller diameter rolls of paper may be used.

Also mounted inside of housing 10 are two modular and identical printer mechanisms (or print engines) 14 and 15. These printing mechanisms are known in the art and are advantageously laser printing mechanisms, but may also be other printing mechanisms known in the art. Laser printing mechanisms are well known in the art so they are described only briefly herein. Laser printing mechanisms are basically comprised of a copier mechanism which uses a special coated drum on which the image is then developed using a dry or wet toner. The toner image is then transferred to sheet or roll paper passing through the mechanism and is then fixed thereon by a number of means including heat. To create the image to be printed on the drum a laser beam is deflected over the surface of the drum responsive to electronic signals which indicate the alphanumeric and other images that are to be printed on the paper. As is known in the art an almost infinite range of images and characters may be printed with a laser printer coupled to a microprocessor arrangement. The present invention, the cooperation of printing mechanisms 14 and 15 to perform two-sided printing, is described further in this specification.

Mounted inside of printer housing 10 are also other well known modules needed to handle roll paper. They are a perforator 16 used to perforate the paper at the point at which a sheet is to be formed, a punch mechanism 17 used to punch holes through an edge of each copy sheet for mounting in binders, a drive station 18, and a paper cutter 19 for cutting the roll paper into individual sheets. Modules 16, 17, 18 and 19 are preferably mounted on a subchassis 31 for ease of removal for maintenance and replacement. Individually cut sheets of paper printed on one or both sides leave cutter 19, exit printer housing 10 at exit 26 and are collated or otherwise stacked by an external stacking assembly 34 in a manner well known in the art.

In operation of the printer, paper 32 from paper roll 13 first passes around a roller 36 at the end of splice station 37. Station 37 is the point at which the paper at the beginning of a new roll paper is spliced to the end of a just depleted roll of paper. This is done so that the new roll of paper need not be therefor through the mechanisms inside printer 10. Paper 32 then enters the housing of printer 10, passes over roller 35 and past sensor 20 which senses the presence of paper in a manner well known in the printer art. When the paper on roll 13 is depleted the absence of paper is detected by sensor 20 which provides a signal to electronics module 12 that causes the printer to stop, and a paper roll replace signal to be given until an empty paper roll 13 is replaced with a new roll of paper. The end of the depleted roll is spliced to the beginning of a new roll at splice station 37 as previously mentioned.

The paper 32 from paper roll 13 then enters the first modular printer mechanism 14 at input 27 and alphanumeric characters and other images are printed on a first or front side of the paper in a manner well known in the art. The paper then passes through rollers 21 at the exit of printer mechanism 14 and passes over a first paper handling device comprising rollers 22 and 23 to the input 29 of the second modular printer mechanism 15 where the paper passes through rollers 24. By orienting printer mechanism 15 with its input 29 to the right and passing the paper around to input 29, the paper is inverted so that the second or backside thereof may be printed thereon in mechanism 15 to provide two-sided printing. The paper exits mechanism 15 at exit 30, passes around a second paper handling device comprising roller 25 and enters perforator 16 on subchassis 31. After passing through perforator 16, punch 17, drive 18, and cutter 19, individual sheets of paper printed on both sides are output from printer housing 10 at exit 26. Printed sheets of paper exiting printer housing 10 enter stacking mechanism 34 which collates or otherwise stacks the printed sheets of paper in a manner well known in the art. Because paper collating/stacking mechanisms are so well known in the art, assembly 34 is not disclosed in any detail herein.

Processing modules 16, 17, 18, and 19 are preferably mounted on a single subchassis 31 so each module may easily be removed as a unit for maintenance or replacement. This helps provide access to printer mechanisms 14 and 15 for cleaning, adjustment, removal, replacement, and installation.

If a customer desires a printer of only one-sided printing, printer mechanism 15 and its associated power supply 33 can be omitted and the paper exiting first printer mechanism 14 at exit 28 is routed to pass around roller 25 and go directly to perforator 16. The paper does not pass around rollers 22 and 23 for one-sided printing with this configuration of the printer. Even if the printer is equipped with both printer mechanisms 14 and 15 for two-sided printing, paper 32 from roll 13 may still be routed as just described when single sided printing is all that is desired. Selectively, one-sided printing may still be done by only one of the two printing mechanisms 14 or 15 when they are both provided in the printer. This capability is implemented by operating switches in electronics module 12 to select the routing and timing of images signals to the printing mechanism 14 or 15 that is selected to do the one-sided printing in a manner known in the art. This capability extends the usefulness of the printer by permitting the printer to be used for one-sided printing after one of the printing mechanisms 14 or 15 has become defective and in need of repair or replacement.

A one-sided printer configuration can easily and quickly be modified to a two-sided printer by the addition of the second print mechanism 15 and associated circuitry which can be performed at the customer site. The customer need not change printers as must presently be done in the art. This flexibility is created because of the novel physical orientation of rollers 22 and 23 and printer mechanisms 14 and 15 and the simple paper handling that is provided by the rollers. As a result of this novel, simple, inexpensive paper handling arrangement the paper handling mechanisms need not be physically modified in any way to perform one-sided or two-sided printing. In the two-sided printing apparatus described herein having a first print engine 14 which is printing the first (or front) side of the page, and a second print engine printing the back side of the page, it is required that the printing performed by the respective print engines 14, 15 be coordinated. The print engines are physically displaced from one another, and as a result, the printing on the front and back side of the same page does not occur simultaneously. The front side of the page is printed initially by the first print station 14 and the printing of the back side of the page is delayed until the back side of the page reaches the second print engine, 15. Thus it is important to know where the actual page is along the paper path before printing can start.

Figure 2:
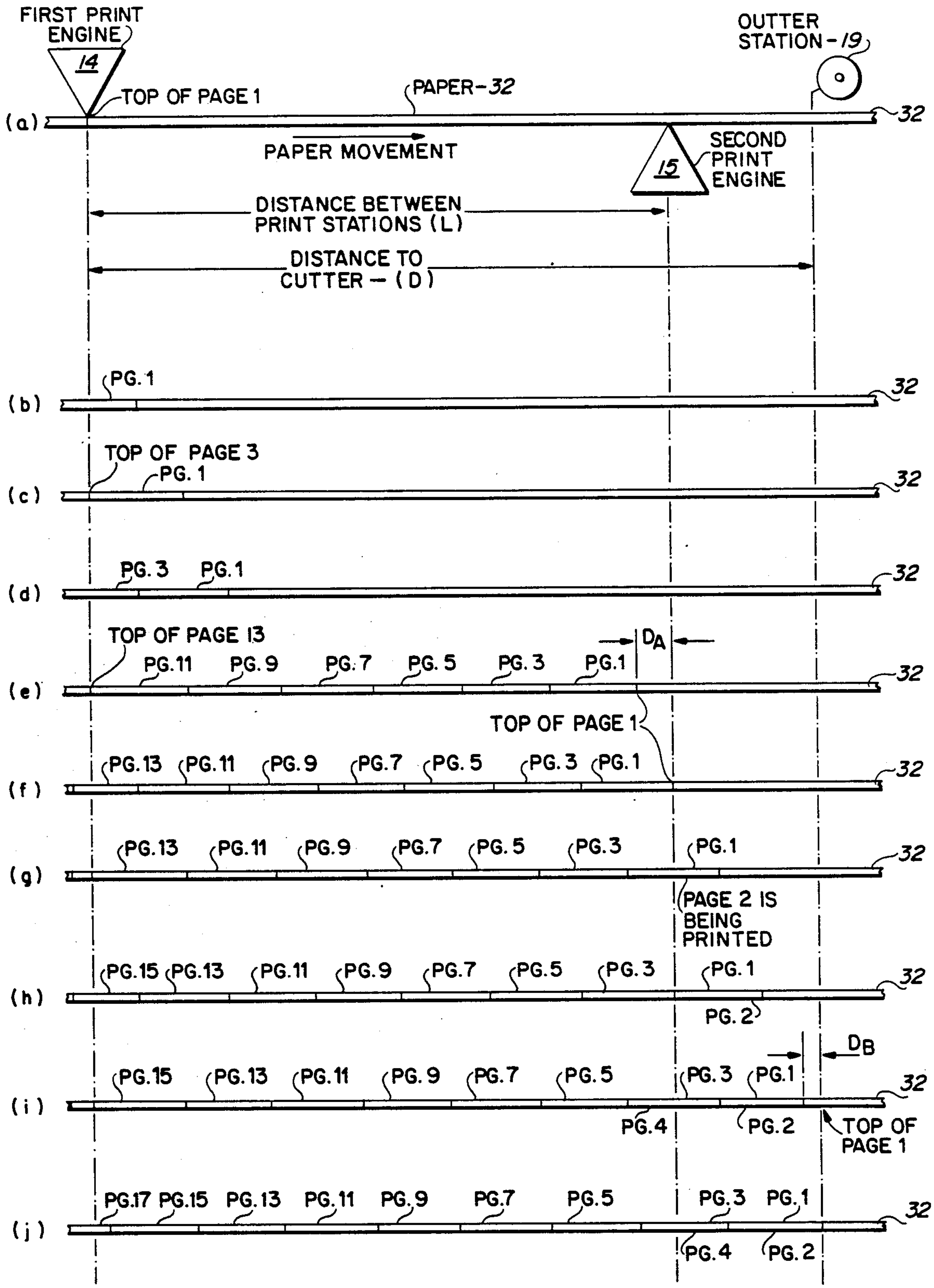
FIG. 2 shows a series of diagrams of the paper movement through the print system.
Figure 3:
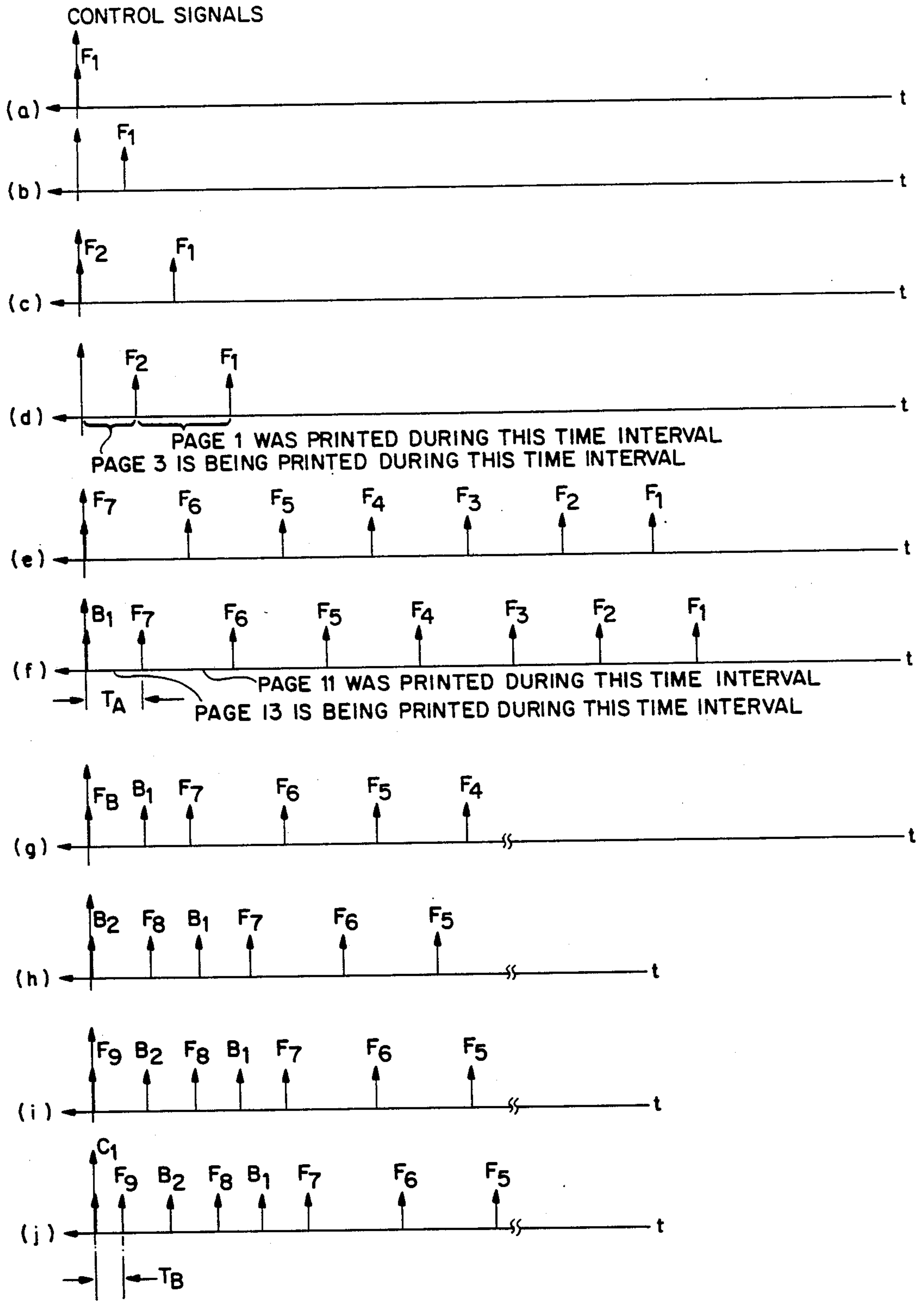
FIG. 3 shows the timing of the control signals to the print stations and, in conjunction with FIG. 2, relates the pages along the printer paper path with control signals.

The control signals which control the coordination of the printing by the first and second print engines 14, 15 will be discussed in conjunction with FIGS. 2 and 3. As the paper 32 moves along the paper path of the print system, a top of page one is defined by a control signal Fl (top of form-front 1). No physical mark is made on the paper but the top of page one thus identified is maintained electronically internal to the print system and is shown in FIGS. 2*b*) and 3A. The Fl control signal is then used as a control signal to the first print engine 14 to indicate that the top of page one is under the print station and the printing of page one may proceed. As the paper continues to move page one is being printed as shown in FIGS. 2*b* and 3*b* (FIG. 3*b* showing the control signal as a function of time and FIG. 2*b*) showing the relative position of the paper as identified by a control subsystem, also referred to herein as the process controller to be described hereinunder, of the printer as it moves along the paper path). After the paper has moved a predetermined amount as determined by the control subsystem, the top of the next page is identified, i.e. the top of page three, page one having completed its printing, the top of page three being identified to the first print engine 14 by a control signal F2, as is shown in FIGS. 2*c* and 3*c* . As the paper moves along, page three is now being printed during the time interval as shown and page one was printed during the time interval between control signals Fl and F2, as shown in FIGS. 2*d* and 3*d*). The paper continues to move as a function of time, the control subsystem having generated control signals Fl through F7, pages one, three, five, seven, nine and eleven having been printed, and the control signal F7 indicating the top of page thirteen to the first print station. At this point in time as shown in FIGS. 2*e* and 3*e* the top of page one is a distance $D_A$ from the second print engine, the distance DA being less than the length of the page. At an interval of time $T_A$ the top of page one will be at the second print engine 15 as shown in FIG. 2(*f*) and 3(*f*.) At this point in time a control signal Bl is generated and coupled to the second print engine indicating that the second print engine can now commence printing the bottom page which corresponds to page one, i.e. page two. During this instant the first print engine is in the process, of printing page thirteen as shown in FIGS. 2(*f*) and 3(*f*) Thus it can readily be seen that while page two is printing on the bottom side of the paper from the second print engine 15, page thirteen is being printed by the first print engine 14 on the front side of the paper. The paper continues to move and both sides of the are now being printed as shown in FIG. 2(*g*,) (*h*,) (*i*,) and FIGS. 3(*g*,) (*h*,) (*i*.) As shown in FIG. 2, the top of page one is a distance $D_B$ away from the cutter station. In a time $T_B$ which corresponds to the paper moving the distance $D_B$, the top of page one is now under the cutter station. At this point in time the control subsystem generates a control signal Cl which is transmitted to the cutter station 19 to initiate cutting the paper. While the cutting action is taking place at the top of page one, page four is being printed by second print engine 15, and page seventeen is being printed by the first print engine 14. FIG. 3(*j*) and 2(*j*) indicate the relative position of the paper and the control signals as they have occurred thus far relative to one another. The control subsystem continues to generate the various top of form (F) signals, bottom of form (B) signals for the bottom side of the paper or the second print engine 15, and the control signals for the cutter station (C). Thus it can be seen that both sides of the page are being printed by a single pass of the paper through the printer system. The length of the page is based on an input from the operator at the operator's console, which can be between 3 ½ inches to 14 inches in the preferred embodiment. Once determined the length is controlled by the control signals.

Figure 4:
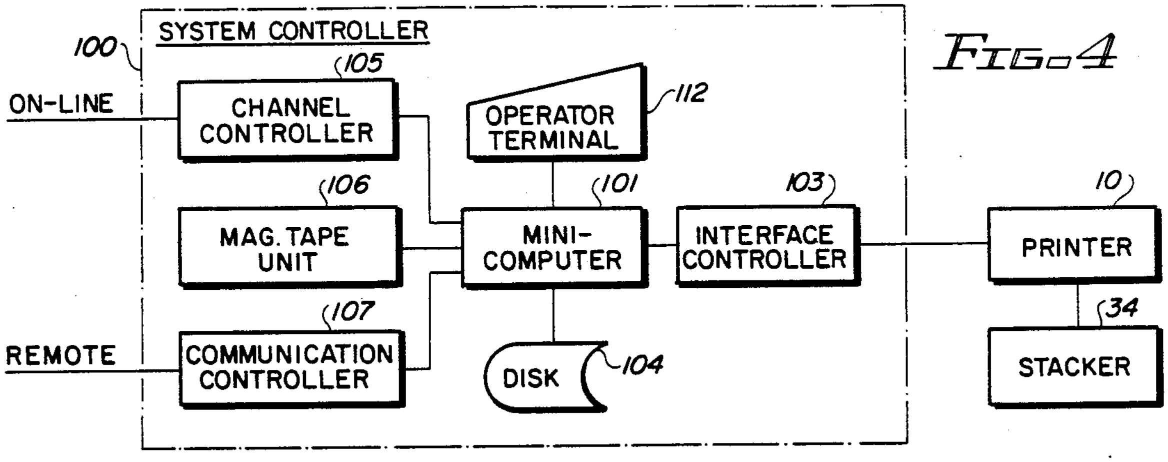
FIG. 4 shows block diagram of a system controller of the printer system.

Referring to FIG. 4 there is shown a block diagram of a system controller 100 which is utilized in the printing system discussed herein. The system controller includes a minicomputer 101 which interfaces to the printer 10 via an interface controller 103. An operator terminal 102 is coupled to the minicomputer 101 to receive operator input commands and operator input information. A disc 104 is also coupled to minicomputer 101. The disc 104 stores or has stored thereon all the information which is to be printed by the printer 10. A process controller (not shown) and a print controller (not shown) of the printer system 10 interfaces with the minicomputer 101 to request the information which is to be printed in some timely fashion. A channel controller 105, mag tape unit 106, and communication controller 107 also interface with the minicomputer 101 and are utilized for inputting information into the minicomputer. These units, which play no significant part in the operation of the printer system 10 will not be discussed further herein. The disc 104 stores all the data including text and form data, to be printed by the printer.

Figure 5:
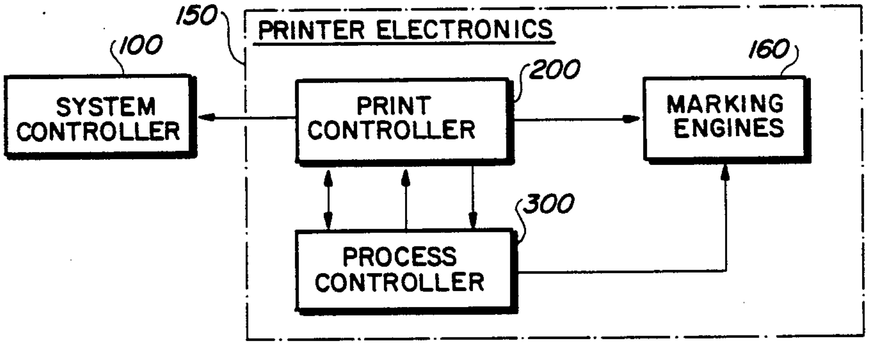
FIG. 5 shows a block diagram of the printer electronics.

Referring to FIG. 5 there is shown a block diagram of the printer electronics 150. The printer electronics interfaces with system controller 100. The printer electronics 150 is comprised of print controller 200 which communicates with the system controller 100. The print controller 200 also is coupled to the marking engines 160, the marking engines essentially comprising first and second print engines 14, 15. The process controller 300 interfaces with the marking engines and the printer electronics 200. The process controller 300 interacts with the print controller transmitting commands, receiving status and indicating control frames. The process controller also generates the various drive motor control signals to the marking engines 160.

Figure 6:
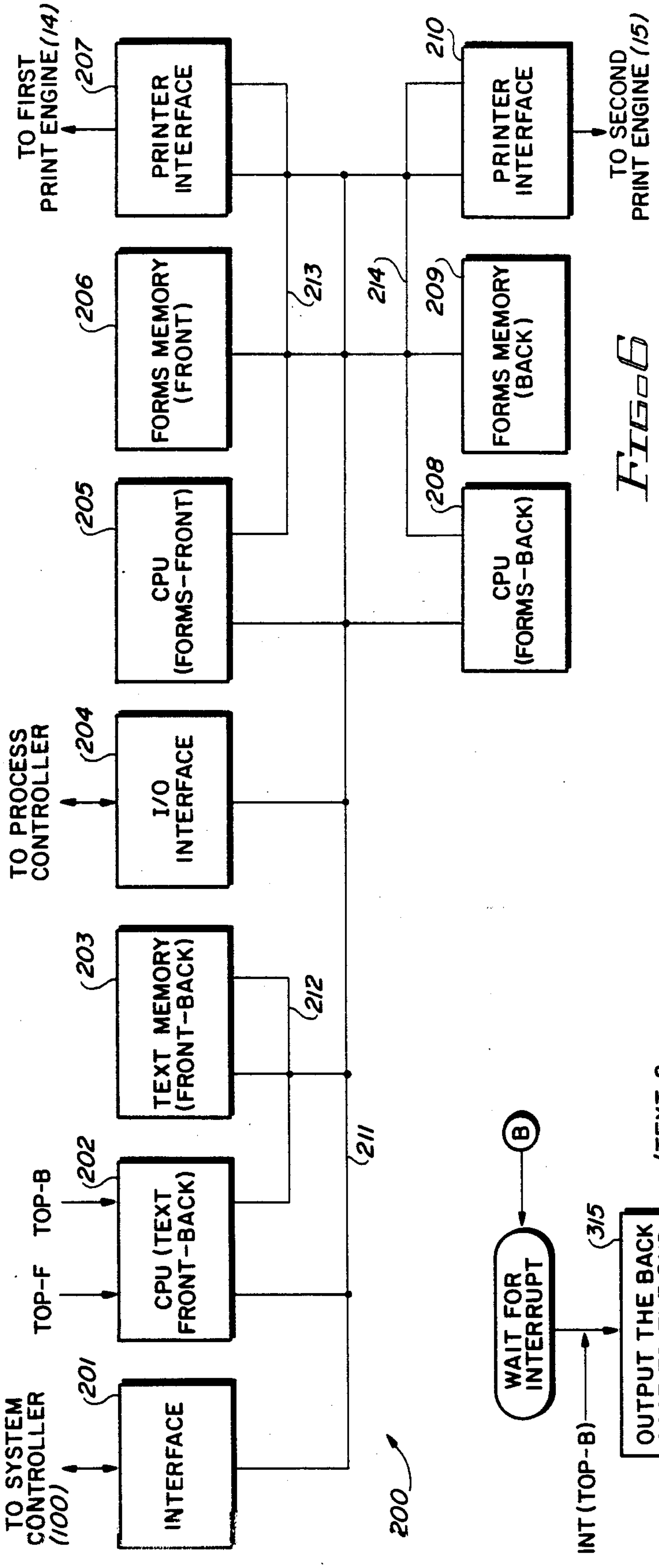
FIG. 6 shows a block diagram of the print controller of the referred embodiment of the present invention.

Referring to FIG. 6 there is shown a block diagram of the print controller 200. The print controller 200 includes an interface 201 which interfaces to the system controller 100. In the preferred embodiment the interface 201 is an ethernet (LAN) controller. Also included is a text CPU 202 which is coupled to a bus 211. In the preferred embodiment the bus 211 is a VME (Motorola) bus. The text CPU 202 operates on the text data received from the system controller 100 which is to be printed. Associated with the text CPU 202 is a text memory 203 which stores the text data for both the front and back text data. The text CPU 202 and text memory 203 are coupled via a second bus 212, in the preferred embodiment the second bus being a local high speed VMX 32 bus. The print controller 200 also includes a front forms CPU 205 and an associated forms memory 206 for processing the forms data for the front side of the page. Also included is a back forms CPU 208, and an associated forms memory 209 for processing and storing the forms data for the back side of the paper. The forms CPU 205, 208 and forms memory 206, 209 for both the front and back are coupled to the bus 211 and are also coupled to one another via a local high speed VMX 32 bus, 213 and 214, respectively. A printer interface 207 is coupled to the first print engine 14, and a second printer interface 210 is coupled to the second print engine 15, the printer interfaces providing the data to the respective print engine which is to print. The text CPU 202 is a general control CPU for the print controller 200 and makes requests to the system controller 100 for the next page. Pages of data are input to the print controller 200 on a block basis for the document to be printed. Data for the pages to be printed by the second print engine 15 must be stored until the page is at the print station and is completed printing. Upon completion of printing by the second print engine, status information is transmitted by the print controller 200, to the process controller 300 via the I/0 interface 204.

The data is transmitted from the system controller upon request by the text CPU 202 in a block format. The blocks have header information which includes page number, font, form number, The forms data is in compressed format and may be several blocks long. A block can be a single page for text data but may be several blocks long for form data. The CPU maintains information which indicate which forms are already in memory and have been already processed in a decompressed format and ready to be transmitted to the print engine. The CPU's utilized in the preferred embodiment is a 68020 Motorola, and the memory units are 4 megabyte units. Based on the inputs from the operator at the start of the job process, the text CPU and forms CPU include the logic for processing the text and forms data such that the paper can be printed upright, inverted, or rotated, and can utilize different fonts and can perform other processing functions in order to process the data received from the system controller in a form ready for printing. It will be recognized in the art that alternative configurations of the print controller 200 may be implemented within the scope and spirit of the invention. For example, given a CPU with processing speeds fast enough to process the text and forms data in a format ready for the printer a single CPU may be utilized. Similarly, given a memory system large enough to store the required data for the printer a single memory unit may be implemented. Further, the CPU can be made to fetch the text data from a storage device rather than requesting the information from a disc in which the text data is stored such as that utilized in the present invention.

Figure 7A:
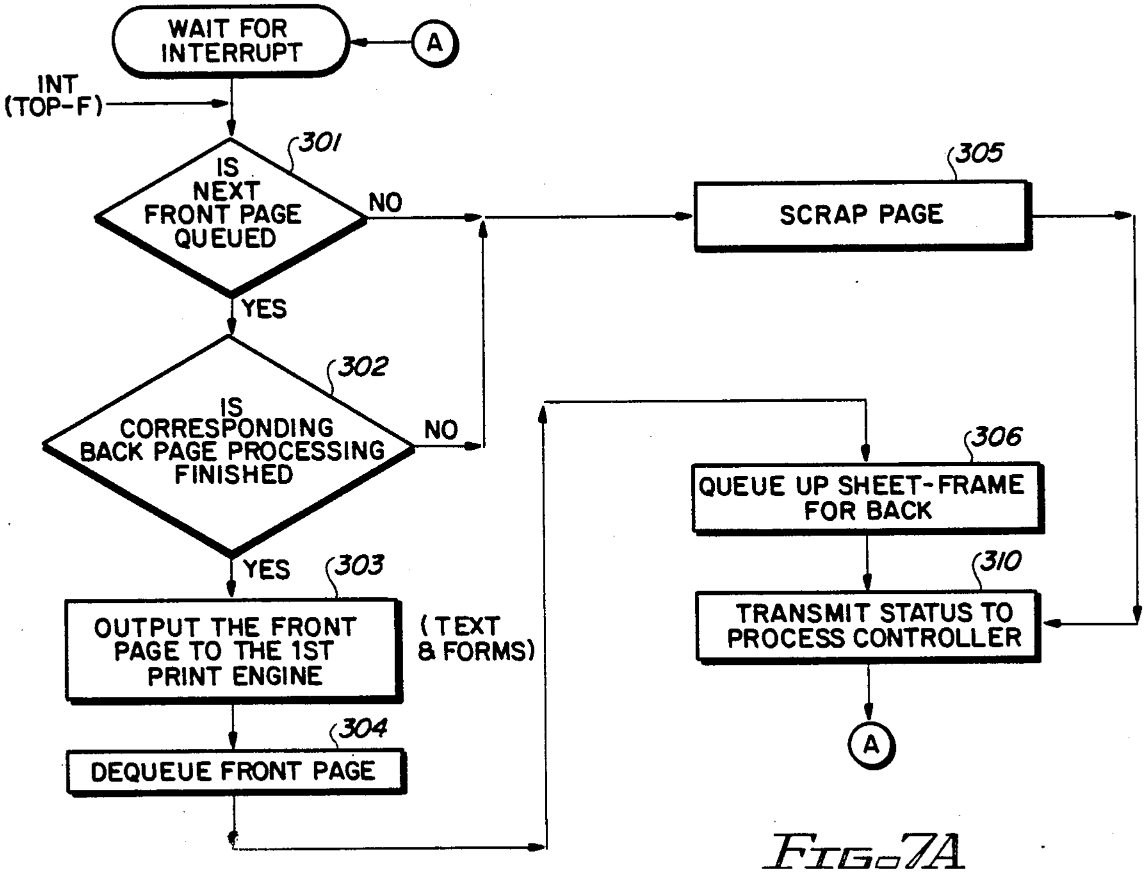
FIG. 7, constituting FIGS. 7A and 7B taken together a flow diagram of the operation of the print controller to achieve the coordination of printig between a first and second print engine.
Figure 7B:
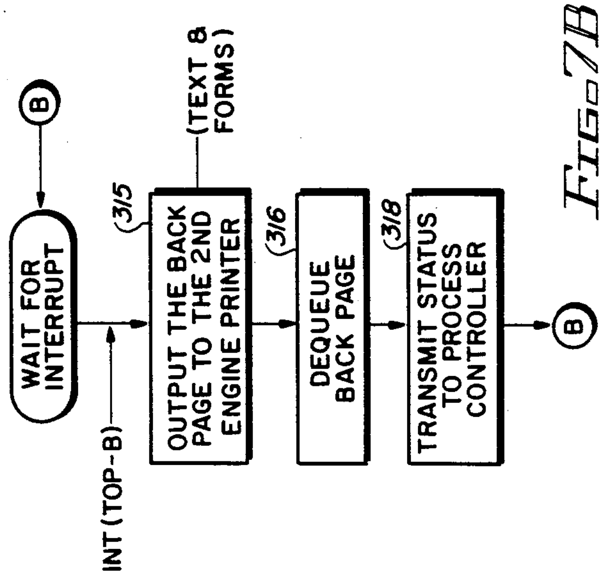

Referring to FIGS. 7A and 7B, which together comprise FIG. 7, there is shown a flow diagram for the response to the control signals to the print controller 200. The print controller having requested the text information from the system controller has formatted the data in a required format and stored the information in the respective memories as described above. When a first control signal is received from the system controller, the control signal being an interrupt signal to the text CPU, the control signal also being denoted as TOP-F, top of page-front, the text CPU 202 which acts as the overall controller for the print controller 200 checks to determine if the next front page is queued, Block 301. If the next front page is not queued the page is indicated as scrapped and Block 305 and the status is transmitted to the process controller 300, Block 310. If the next front page is queued and the corresponding back page is finished processing, the text CPU outputs the front page data to the first print engine Blocks 302, 303. If the corresponding back page has not finished processing the page is scrapped and the status transmitted to the process controller. Upon outputting the front page to the first print engine, including both text and forms information, the front page is dequeued Block 304 and the sheet frame for the back is queued up Block 306. Upon completion, the process returns and waits for the next TOP-F control signal.

When the second control signal is received, TOP-B, i.e., top of page back, the process continues and outputs the back page to the second print engine which has been queued, the output including both text and forms information for the second page, Block 315. The back page that has been printed is now dequeued, Block 316 thereby allowing the next page to be queued and the information relative to the printing status of the page is transmitted to the process controller, Block 318. The process continues by returning to a wait status for waiting for the next interrupt.

While there has been shown what is considered the preferred embodiment of the present invention, it will be manifest that many changes and modifications be made therein without departing from the essential spirit and scope of the invention. It is intended, therefore, in the annexed claims to cover all such changes and modifications which fall within the true scope of the invention.

I claim:

1. A printer system for printing he front and back sides of paper processed therethrough, said printer system comprising:

(A) first and second print engines placed in a path through which paper to be printed travels, said first and second print engines each having a paper input, a paper output and a print station situated intermediate said paper input and said paper output, said respective print stations of said first and second print engines being displaced an operative distance L from one another;

(B) a source of a continuous stream of paper;

(C) paper cutting means adapted to cut said continuous stream of paper into individual pages;

(D) guide means guiding said continuous stream of paper;

(1) from said source to said input of said first print engine;

(2) from said output of said first print engine to said input of said second print engine, said continuous stream of paper being inverted during its transit therebetween; and (3) from said output of said second print engine to said paper cutting means;

(E) means for generating a first control signal indicating that a reference position along the length of said continuous stream of paper is under said print station of said first print engine, which said first control signal identifies the position of the top of a first page to be printed;

(F) means for generating a second control signal delayed in time from said first control signal equal to the time required for said reference position to transit said operative distance L;

(G) means for generating a third control signal delayed in time from said first control signal equal to the time required for said reference position to transit from beneath said print station of said first print engine to a position one page length beyond said paper cutting means;

(F) means responsive to the generation of said first control signal and to the passage of said reference position through said first print engine for causing said first print engine to print a first page of information on said continuous stream of paper;

(H) means responsive to the generation of said second control signal and to the passage of said reference position through said second print engine for causing said second print engine to print a second page of information on said continuous stream of paper on the reverse side thereof from the first page of information; and (I) means responsive to the generation of said third control signal for severing said continuous stream of paper, the printer thereby issuing the first and second pages of information on the two sides of a discrete sheet of paper.

2. The printer system of claim 1 in which said paper outputs of said first and second print engines face in opposite directions and in which said guide means guides said continuous stream of paper from said output of said first print engine, past said second print engine and in reversal to said input of said second print engine.

3. The printer system of claim 1 in which said paper outputs of said first and second print engines face in opposite directions and in which said guide means guides said continuous stream of paper from said output of said first print engine, past said second print engine in vertical displacement with respect thereto and in reversal to said input of said second print engine.

4. A method for printing the front and back sides of paper processed a printer comprising the steps of:

(A) disposing first and second print engines in a path through which paper to be printed travels in a continuous stream, which first and second print engines are characterized as each having a paper input, a paper output and a print station situated intermediate the paper input and the paper output, the respective print stations of the first and second print engines being displaced at operative distance L from one another;

(B) providing a source of a continuous stream of paper;

(C) providing paper cutting means adapted to cur said continuous stream of paper in to individual pages;

(D) guiding said continuous stream of paper sequentially:

(1) from the source to the input of the first print engine;

(2) from said output of the first print engine to the input of the second print engine in such a manner that the continuous stream of paper is inverted during its transit therebetween; and (3) from the output of the second print engine to the paper cutting means;

(E) generating a first control signal indicating that a reference position identifying the position of the top of a first page to be printed along the length of the continuous stream of paper is under the print station of the first print engine;

(F) generating a second control signal delayed in time from the generation of the first control signal equal to the time required for the reference position to transit the operative distance L;

(G) generating a third control signal delayed in time from the generation of the first control signal equal to the time required for the reference position to transit from beneath the print station of the first print engine to a position one page length beyond the paper cutting means;

(F) responding to the generation of the first control signal and to the passage of the reference position through the first print engine by causing the first print engine to print a first page of information on the continuous stream of paper;

(H) responding to the generation of the second control signal and to the passage of the reference position through the second print engine by causing the second print engine to print a second page of information on the continuous stream of paper on the reverse side thereof from the first page of information; and (I) responding to the generation of the third control signal for severing the continuous stream of paper, the printer thereby issuing the first and second pages of information on the two sides of a discrete sheet of paper.

* * * * *